United States Patent
Gentemann et al.

(10) Patent No.: US 6,942,225 B2
(45) Date of Patent: Sep. 13, 2005

(54) SEAL ARRANGEMENT

(75) Inventors: Martin Gentemann, Harsum (DE); Michael Koch, Kalefeld (DE)

(73) Assignee: Meteor Gummiwerke K. H. Badje GmbH & Co., Bockenem (DE)

( * ) Notice: Subject to any disclaimer, the term of this patent is extended or adjusted under 35 U.S.C. 154(b) by 110 days.

(21) Appl. No.: 10/472,612
(22) PCT Filed: Mar. 9, 2002
(86) PCT No.: PCT/EP02/02628
§ 371 (c)(1), (2), (4) Date: Sep. 18, 2003
(87) PCT Pub. No.: WO02/078991
PCT Pub. Date: Oct. 10, 2002

(65) Prior Publication Data
US 2004/0094906 A1 May 20, 2004

(30) Foreign Application Priority Data
Mar. 20, 2001 (DE) .......................... 201 04 747

(51) Int. Cl.$^7$ .............................. F16J 15/02; E06B 7/16
(52) U.S. Cl. ...................... 277/641; 277/644; 277/921; 49/493.1
(58) Field of Search .................................. 277/637, 640, 277/642, 644, 645, 921; 49/490.1, 489.1, 493.1

(56) References Cited

U.S. PATENT DOCUMENTS

| | | | | |
|---|---|---|---|---|
| 4,060,272 A | * | 11/1977 | Mori ........................... | 296/93 |
| 4,119,325 A | | 10/1978 | Oakley et al. | |
| 4,614,061 A | * | 9/1986 | Brocke ......................... | 49/440 |
| 4,916,864 A | * | 4/1990 | Thompson ................... | 49/478.1 |
| 5,010,689 A | * | 4/1991 | Vaughan ....................... | 49/440 |
| 5,331,768 A | * | 7/1994 | Takeuchi .................... | 49/493.1 |
| 5,462,292 A | * | 10/1995 | Yamane ....................... | 277/642 |
| 5,634,644 A | * | 6/1997 | Guillon ....................... | 277/641 |
| 6,321,490 B1 | * | 11/2001 | Vance .......................... | 49/377 |
| 6,571,513 B2 | * | 6/2003 | Maass ......................... | 49/489.1 |

FOREIGN PATENT DOCUMENTS

| | | | | |
|---|---|---|---|---|
| DE | 38 36 687 A1 | 5/1990 | .............. | B60J/1/17 |
| DE | 295 13 597 U1 | 11/1995 | ............ | B60J/10/00 |
| DE | 198 03 445 A1 | 9/1998 | ............ | B60J/10/08 |
| DE | 297 20 053 U1 | 4/1999 | ............ | F16J/15/10 |
| DE | 199 59 992 A1 | 6/2000 | ............ | B60J/10/08 |
| DE | 199 12 176 A1 | 9/2000 | ............ | E06B/7/22 |
| EP | 0 479 643 A1 | 9/1991 | ............ | B60J/10/00 |
| FR | 2 520 467 | 1/1983 | ............ | F16J/15/10 |
| FR | 2 696 377 | 10/1992 | ............ | B60J/10/04 |
| GB | 892364 | 3/1962 | .................... | 20/87 |
| GB | 992673 | 5/1965 | | |

\* cited by examiner

*Primary Examiner*—Alison K. Pickard
(74) *Attorney, Agent, or Firm*—Synnestvedt & Lechner LLP

(57) ABSTRACT

A seal to seal a gap between two cooperating components is disclosed. The seal includes a grip rail attachable to the first component. The grip rail has opposite edge portions to which multiple latching regions are attached. A base having opposite sides is positioned adjacent to the grip rail. Multiple counter latching regions that engage with the latching regions are positioned along one side of the base. A sealing profile adapted to engage the second component is mounted on the other side of the base. A first sealing lip is formed along one counter latching region, and a second sealing lip is formed on the sealing profile. Both sealing lips project outwardly for engagement with the first component.

23 Claims, 3 Drawing Sheets

SEAL ARRANGEMENT

FIELD OF THE INVENTION

The invention relates to a sealing arrangement for a gap between two cooperating components, for example, a door or a hinged lid of a motor vehicle, and an edge of an opening which is to be closed.

BACKGROUND OF THE INVENTION

German and French patent documents DE 198 03 445, FR 2 520 467, DE 295 13 597 and DE 297 20 053 disclose comparable sealing arrangements which are intended to seal the gap between on the one hand a closing element, which can be moved relatively to an opening in a motor vehicle, and on the other hand the inner-side edge region of the opening which faces said dosing element. They generally consist of a holding portion, which is adapted for attachment either to the inner edge region of the opening or to the outer-side edge region of the closing element, and of a sealing profile which is integrally formed on said holding portion and which in the closed state of the closing element lies in a sealing manner under resilient deformation against the respective opposite-lying edge region. This type of sealing arrangement surrounds the entire opening. An essential feature of these known sealing arrangements is that the edge structures of the opening or of the closing element which cooperate with the holding portions must comprise a special adaptation to suit the respective holding portion, in particular with regard to its secure attachment. This adaptation can be a circumferential flange, on to which the holding portion is placed, in a sequence of bores, with which a positive-locking, push-button-like connection is established, or said adaptation can be special mold elements which are intended for positive, resilient latching engagement.

A sealing arrangement is known from German Patent Publication DE 199 12 176, wherein a profile part which is substantially L-shaped in cross-section and comprises an embedded reinforcement is adhered to a door frame by means of an adhesive layer. The profile part is supported beyond the adhesive layer on the door frame by cross-pieces. Instead of using the adhesive layer, the profile part can also be held on the frame by clip connections which can be produced by crimping (column 2, lines 61 to 64). This profile part is to be connected to the door frame initially by a robot. In a second working step which is to be conducted preferably by hand, a profile seal is then placed with an attachment base on to an upstanding assembly limb of the profile part having a Christmas-tree profile. The profile seal is not connected on the inside to the L-shaped profile part. During operation, this can lead to visually unfavorable gaps and progressions of the profile seal. The same applies to the further embodiments of known sealing arrangements set forth above.

U.S. Pat. No. 4,119,325 discloses a sealing arrangement, in which a grip rail consisting of a plastics material is used for the attachment of a sealing profile to a door frame and comprises on its side facing the sealing profile two latching regions which are disposed transversely with respect to its longitudinal extension at a mutual spaced Interval and which are intended for resilient latching engagement with the holding region of the sealing profile. The holding region forms a generally T-shaped latching base which is inserted into a groove which is formed in a complementary manner with the cooperation of a U-shaped locking part. The grip rail is intended for attachment on to the edge region of the door of a container and is provided with holding flanges which engage laterally around said door and which form a sealing abutment on the door. For its part the sealing profile is characterized by two sealing lips which lie against the inner side edge region of the opening, so that even when the door is in the closed state there Is a visually perceptible progression of the sealing arrangement which is characterized by the fact that the grip rail and the profile part are positioned next to each other. By virtue of the fact that a particular U-shaped locking part is required to form a T-shaped groove, this produces in mechanical terms a relatively complicated attachment of the sealing profile to the grip rail. In dependence upon the material formation of these parts, this can also give rise to disadvantages for the endurance of sealing effect.

Finally, European Patent Publication EP 0 479 643 discloses a generic sealing arrangement for sealing a gap between two cooperating components. This sealing arrangement Is intended for sealing a gap between two cooperating components and is characterized inter alia in that it can be fixed to one of the components by way of a grip rail or a base plate, wherein a holding region of a sealing profile can be positively latched to the grip rail, wherein a sealing region of the sealing profile which cooperates in a sealing manner with the other one of the components is attached to the holding region, wherein the grip rail comprises two mutually spaced apart latching regions, each of which can be latched to a complementary counter latching region of the holding region, wherein the first and second latching regions are provided on longitudinal edges of the grip rail and wherein both latching regions extend along an inner longitudinal edge of the latching base. The base plate consists of a material according to a type of hot-melt adhesive which can be adhered by heating to a support e.g. a portion of the vehicle bodywork. Both latching regions are formed by means of a T-shaped profile which is integrally formed on the base plate and which is located in central region of the base plate. This sealing arrangement Is thus characterized by merely one central, relatively narrow mounting and attachment region.

SUMMARY AND OBJECTS OF THE INVENTION

Against this background, it is the object of the invention to improve a generic sealing arrangement whilst avoiding the disadvantages associated with the prior art with regard to the fit and the sealing effect. This object is achieved by the use of three latching regions on the grip rail and corresponding counter latching regions that engage the latching regions, the counter latching regions being formed on the base of a sealing profile.

The sealing region is preferably tubular in formation. The latching connection of the latching regions and the counter latching regions together ensures that the profile is held securely on the grip rail even during heavy duty operation. When the profile is damaged, it is then possible to release these latching connections with a small amount of effort and latch a new profile to the grip rail which remains in place. Initially, the grip rail can be fixed to one of the components and then the pro file can be latched to the grip rail. However, it is also possible initially to latch the profile and the grip rail together and subsequenty to fix this preassembled subassembly to one of the components. By virtue of the fact that a first and a second latching region are provided on longitudinal edges of the grip rail, wherein a first latching region is formed along an outer longitudinal edge of the grip rail, this provides a particularly large base for mounting the profile on the grip rail and ensures that the profile is held correspondingly securely. The first sealing lip according to the invention serves to provide a perfect lateral termination of the holding region and an effective seal with respect to the first component which supports the sealing arrangement. In a similar manner, the second sealing lip according to the invention serves to provide a visually pleasing and in particular sealed outer termination of the lo profile with respect to the first component.

Owing in particular to the fact that two latching regions are provided, wherein a first latching region is formed on an outer longitudinal edge of the grip rail and wherein a third latching region is disposed at a spaced interval from this first latching region approximately in the transverse center of the grip rail and that counter latching regions of the holding region which are combined to form a latching base can be latched to the first and the third latching region, the secure holding of the profile on the grip rail can be improved. The term "external" relates in this case e.g. to the external side of a motor vehicle.

The grip rail comprises a base supported on the first component by two support ribs which extend at transverse spaced intervals in parallel with the length of the grip rail. This facilitates and improves the positioning of the grip rail on the first component.

By making the grip rail from polyoxymethylene, a polyamide or of thermoplastic elastomer with a Shore D hardness of 40 to 80, it is possible to facilitate and improve the locking of the holding region on its inner side.

By integrally forming the ribs on the base from soft thermoplastic elastomer with a Shore A hardness of 30 to 50, a grip rail is produced which has sufficient rigidity, strength and dimensional stability.

By using clips disposed between the support ribs at spaced intervals, a particularly effective sealing effect is achieved between the support ribs and the first component, the first component having bores in spaced relation for receiving the clips.

Using injection molding to form the clips and the grip rail in an injection molding tool from a synthetic material ensures on the one hand that the grip rail is attached rapidly and securely to the first component and on the other hand serves to prevent moisture from passing through the bores.

Extruding the grip rail and attaching the clips to it is particularly advantageous, if the installation situation for the grip rail has a three-dimensional progression. It is then possible in the old tool to give the grip rail this three-dimensional shape and to ensure that the grip rail can be attached to the first component without becoming jammed.

When the base of the sealing profile is co-extruded from soft rubber or a thermoplastic elastomer with a Shore A hardness of 50 to 80 and the rest of the sealing profile is co-extruded from cellular rubber or a foamed thermoplastic elastomer having a Shore A hardness of 15 to 45, the procedure can be conducted in a cost-effective manner if the installation situation for the grip rail is substantially two-dimensional. The clips can then be adhered subsequently to the grip rail or can be welded as synthetic material clips on to the grip rail.

Extruding the sealing profile from soft rubber or a thermoplastic elastomer having a Shore A hardness of 40 to 70 ensures that the profile is held on the grip rail in a particular stable manner. At the same time, it is possible in the event of low closing forces to ensure a favorable sealing effect for the first component with respect to the second component.

Depending upon the application, it is also possible to extrude the sealing profile from cellular rubber or a foamed thermoplastic elastomer having a Shore A hardness of 15 to 45.

BRIEF DESCRIPTION OF THE DRAWINGS

These and further features and advantages of the invention will be explained in detail hereinunder with reference to the exemplified embodiments illustrated in he drawings, in which.

DETAILED DESCRIPTION OF THE PREFERRED EMBODIMENTS

Figure 1:
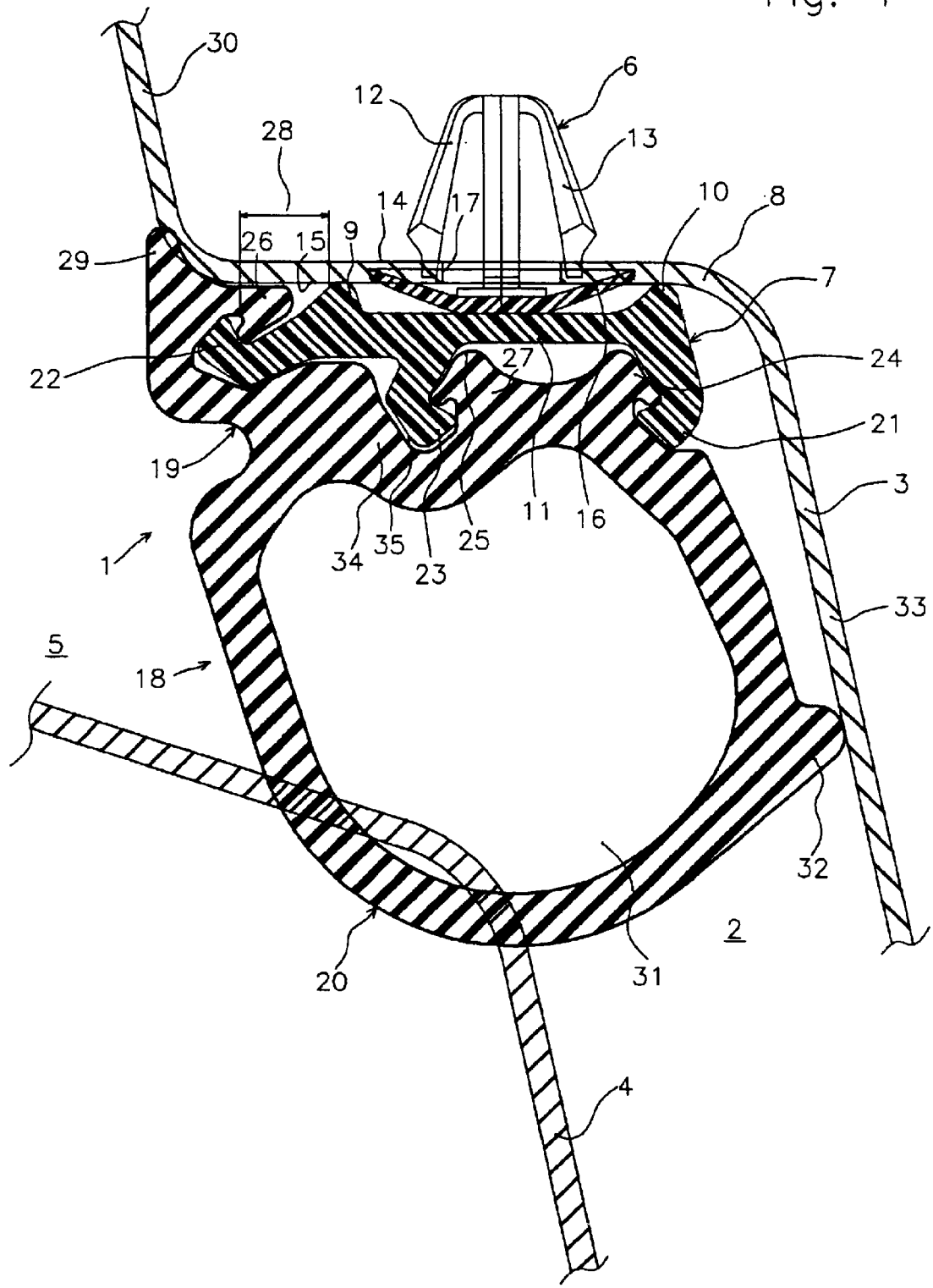
FIG. 1 shows a cross-section of a first embodiment of an assembled sealing arrangement

FIG. 1 shows a sealing arrangement 1 for a gap 2 between a first component 3 and a second component 4. The first component 3 is a closing element, such as e.g. a door or a hinged lid of a motor vehicle. The second component 4 is formed in FIG. 1 by an edge of an opening 5 of a motor vehicle which is to be closed, wherein the edge is a component of a sill of the motor vehicle. The sealing arrangement 1 is not only able to extend along the base of the door 3, as shown in FIG. 1, but can also extend right around the opening 5.

A grip rail 7 is fixed to the first component 3 by means of mutually spaced apart clips 6. Since a lower connection plate 8 of the first component 3 extends substantially linearly, the grip rail 7 can be formed in a two-dimensional manner and can be extruded from synthetic material. Suitable synthetic materials are e.g. polyoxy methylene (POM), polyamide (PA) or a thermoplastic elastomer (TPE) with a Shore D hardness of 40 to 80.

Support ribs 9 and 10 are integrally formed on a base 11 of the grip rail 7 and are pulled by resilient limbs 12 and 13 of the clip 6, which are supported on an upper side 14 of the connection plate, into position against a lower side 15 of the connection plate 8. Each clip 6 is welded or adhered to the base 11 by a sealing disc 16.

Each clip 6 is inserted from below through a bore 17 in the connection plate 8, until the limbs 12; 13 above the upper side 14 are able to pivot outwards to their operational position. In this operational position, an outer edge of the sealing disc 16 lies in a sealing manner against the lower side 15 and prevents moisture from passing through the bore 17.

Instead of using the particular clip 6 illustrated in FIG. 1 it is also possible to use other clip types, which are known per se, offering the same advantage and performing a similar function.

In addition to the grip rail 7, the sealing arrangement 1 also comprises a profile 18 with a holding region 19 and a sealing region 20. The grip rail 7 is provided with a first latching region 21, a second latching region 22 and a third latching region 23 transverse to a longitudinal extension of the profile 18 and at a mutual spaced interval from each other. Each of these latching regions 21 to 23 is formed in the manner of a barb. A complementary latching region 24, 25 and 26 of the holding region 19 can be latched to each latching region 21 to 23, as illustrated in the final state in FIG. 1. The counter latching regions 24, 25 are combined to form a latching base 27 which is latched to the first latching region 21 and the third latching region 23.

The second latching region 22 is formed on an inner longitudinal edge of the grip rail 7 and is disposed at a transverse spaced interval 28 from the inner support rib 9. The transverse spacing 28 creates a space, into which the counter latching region 26 of the holding region 19 can be pressed and can snap in a latching manner. Integrally formed on this inner counter latching region 26 is a first sealing lip 29. When the counter latching region 26 is latched in as shown in FIG. 1, the first sealing lip 29 lies in a sealing manner against an ascending extension 30 of the connection plate 8.

The sealing region 20 is completely tubular in formation with a hollow space 31 and is integrally formed on the holding region 19. On the outside and at a spacing from the grip rail 7, the sealing region 20 supports a second sealing lip 32 which in the assembled state of the sealing arrangement 1 as shown in FIG. 1 cooperates in a sealing manner with a descending extension 33 of the connection plate 8. This sealing effect increases further if the door 3 is closed and the sealing region 20 is compressed by the stationary sill 4. When the door is closed, this effectively prevents moisture from passing from the outside in FIG. 1, i.e. from the right-hand side, past the sealing arrangement, through the gap 2 and into the opening 5. In this compressed state of the sealing region 20, a solid bead 34 of the holding region 19 also lies against the rear side 35, on the left-hand side in FIG. 1, of the third latching region 23. This acts against the unintentional release of the latching base 27 from its latching engagement with the latching regions 21, 23.

The assembly of the sealing arrangement 1 is preferably performed in such a manner that initially the either two-dimensional or three-dimensional grip rail 7 is fixed to the first component 3. Then, the latching base 27 is pressed into the space between the first latching region 21 and the second latching region 22 and is latched at this site. Subsequently, the first sealing lip is pivoted upwards together with the counter latching region 26 and the counter latching region 26 is pressed into the space provided in the region of the transverse spacing 28, until the counter latching region 26 has securely latched with second latching region 22. The sealing arrangement 1 is thus ready for operation. If the profile 18 has been damaged, it can be removed from the grip rail 7 without damaging the grip rail 7 and can be replaced by a new profile 18 in the assembly sequence described.

In the case of FIG. 1, the profile 18 as a so-called mono-profile consists entirely of soft rubber with a Shore A hardness of 40 to 70. However, the profile 18 can also be entirely extruded from TPE with the same level of hardness. It is important that in the case of these embodiments a level of hardness is selected for the profile 18 which on the one hand has a sufficiently secure fit in the holding region 19 and on the other hand has a sufficient degree of elasticity in the sealing region 20 for acceptable closing forces of the door 3.

In all of the Figures of the drawings, like parts are designated by like reference numerals.

Figure 2:
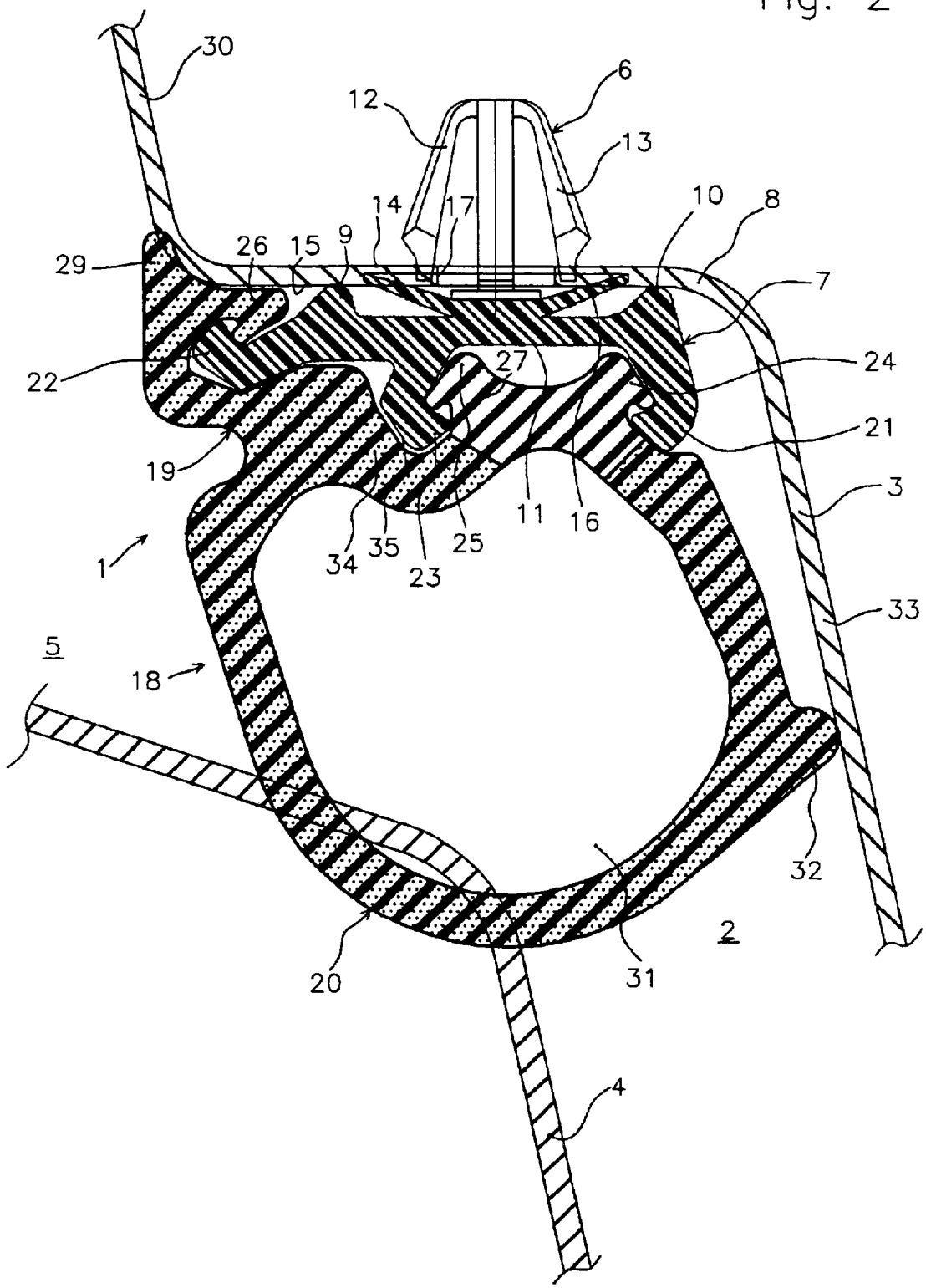
FIG. 2 shows a corresponding cross-section of another sealing a arrangement.

In the case of the exemplified embodiment as shown in FIG. 2, the grip rail is injection-molded in a molding tool to create a three-dimensional shape. The clips 6 preferably consist of the same synthetic material as the grip rail 7 and were injected on to the grip rail 7 in the molding tool. The latching base 27 consists of soft rubber with a Shore A hardness of 50 to 80. The latching base could also be manufactured from a correspondingly hard TPE. In FIG. 2, the rest of the profile 18 is co-extruded together with the latching base 27 from cellular rubber with a Shore A hardness of 15 to 45. Instead of using the cellular rubber, it would also be possible to use a foamed TPE with the same degree of hardness.

Figure 3:
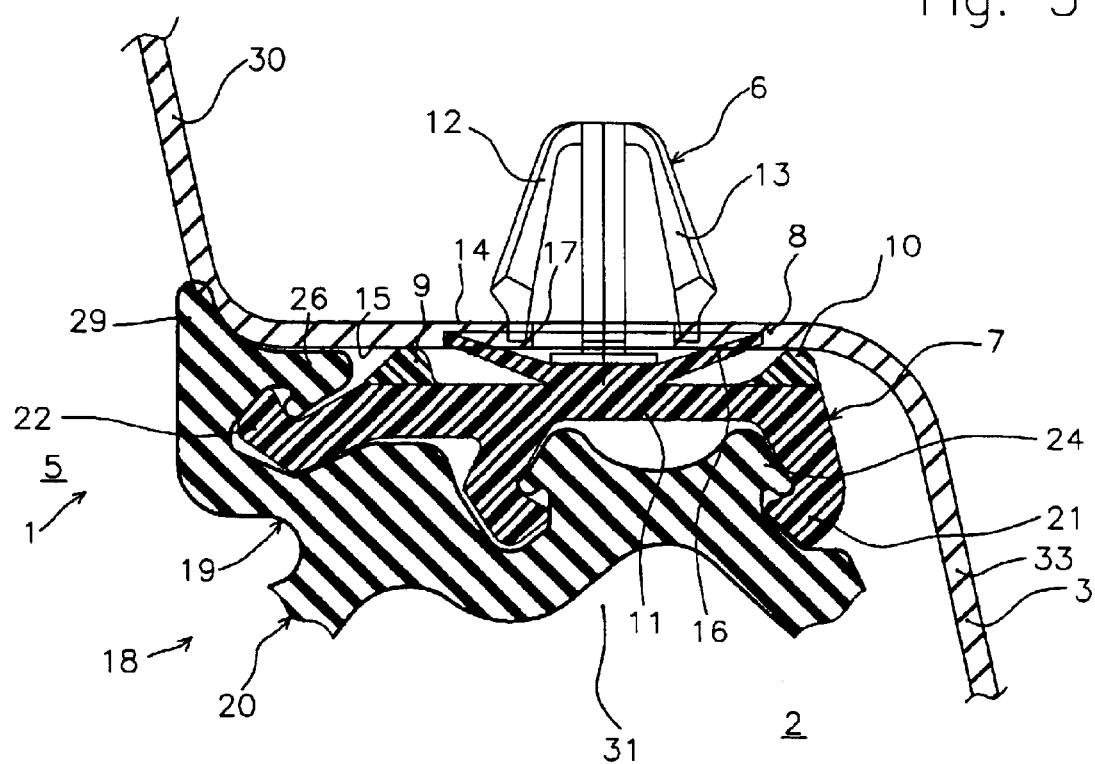
FIG. 3 shows a cross-section of a portion of yet another sealing arrangement.

In the case of the exemplified embodiment as shown in FIG. 3, this Figure illustrates only the upper portion of the exemplified embodiments shown on an enlarged scale in FIGS. 1 and 2. The profile 18 consists of soft rubber with a Shore A hardness of 40 to 70. The grip rail 7 was injection-molded in the molding tool from synthetic material, e.g. TPE with a Shore D hardness of 40 to 80 to create a three-dimensional shape. In the molding tool, the clips 6 were also injection-molded thereon together with the support ribs 9, 10 from a comparatively soft TPE with a Shore A hardness of 30 to 50.

What is claimed is:

1. A seal adapted to seal a gap between a first and a second cooperating component, said seal comprising:

an elongated grip rail attachable to said first component, said grip rail having opposite edge portions oriented lengthwise therealong;

a first latching region positioned along one of said edge portions;

a second latching region positioned along the other of said edge portions;

a third latching region positioned along said grip rail intermediate between said first and second latching regions;

an elongated base positioned adjacent to said grip rail and having first and second sides positioned opposite each other;

a first counter latching region mounted lengthwise along said first side of said base and engaged with said first latching region;

a second counter latching region mounted lengthwise along said first side of said base in spaced relation to said first counter latching region, said second counter latching region engaged with said second latching region;

a third counter latching region mounted lengthwise along said first side of said base intermediate between said first and second counter latching regions and in spaced apart relation thereto, said third counter latching region engaged with said third latching region, said counter latching regions adapted to attach said base to said grip rail;

a flexible, elongated sealing profile mounted on said second side of said base, said sealing profile adapted to engage said second component and seal said gap;

a first sealing lip integrally formed along said first counter latching region and projecting outwardly therefrom for engagement with said first component; and a second sealing lip integrally formed on said sealing profile and projecting outwardly therefrom for engagement with said first component.

2. A seal according to claim 1, further comprising a pair of support ribs mounted lengthwise along said grip rail in spaced apart relation to one another, said support ribs projecting outwardly from said grip rail toward said first component for engagement therewith.

3. A seal according to claim 2, wherein at least one of said support ribs is positioned in spaced apart relation at a predetermined distance from said second latching region.

4. A seal according to claim 3, wherein said grip rail has a Shore D hardness of between 40 to 80 and is formed from a material selected from the group consisting of polyoxymethylene, polyamide and thermoplastic elastomer.

5. A seal according to claim 3, wherein said support ribs are formed of a thermoplastic elastomer with a Shore A hardness between 30 and 50.

6. A seal according to claim 2, wherein said grip rail has a Shore D hardness of between 40 to 80 and is formed from a material selected from the group consisting of polyoxymethylene, polyamide and thermoplastic elastomer.

7. A seal according to claim 2, wherein said support ribs are formed of a thermoplastic elastomer with a Shore A hardness between 30 and 50.

8. A seal according to claim 7, wherein said first component has a plurality of bores arranged in spaced apart relation, said seal further comprising a plurality of clips positioned between said ribs in spaced relation along and projecting outwardly from said grip rail, said clips each being engageable with one of said bores in said first component.

9. A seal according to claim 7, wherein said base is co-extruded with said sealing profile, said base being formed of a material selected from the group consisting of rubber and a thermoplastic elastomer having a Shore A hardness between 50 and 80 and said sealing profile is formed of a material selected from the group consisting of cellular rubber and a thermoplastic elastomer having a shore hardness between 15 and 45.

10. A seal according to claim 2, wherein said first component has a plurality of bores arranged in spaced apart relation, said seal further comprising a plurality of clips positioned between said ribs in spaced relation along and projecting outwardly from said grip rail, said clips each being engageable with one of said bores in said first component.

11. A seal according to claim 10, wherein said clips are integrally formed with said grip rail by injection molding of a synthetic material.

12. A seal according to claim 11, wherein said sealing profile is extruded from a material selected from the group consisting of rubber and a thermoplastic elastomer having a Shore A hardness between 40 and 70.

13. A seal according to claim 11, wherein said sealing profiled is extruded from a material selected from the group consisting of cellular rubber and foamed thermoplastic elastomer having a Shore hardness between 15 and 45.

14. A seal according to claim 10, wherein said grip rail is extruded and said clips are attached onto said grip rail.

15. A seal according to claim 14, wherein said base is co-extruded with said sealing profile, said base being formed of a material selected from the group consisting of rubber and a thermoplastic elastomer having a Shore A hardness between 50 and 80 and said sealing profile is formed of a material selected from the group consisting of cellular rubber and a thermoplastic elastomer having a shore hardness between 15 and 45.

16. A seal according to claim 14, wherein said sealing profile is extruded from a material selected from the group consisting of rubber and a thermoplastic elastomer having a Shore A hardness between 40 and 70.

17. A seal according to claim 14, wherein said sealing profiled is extruded from a material selected from the group consisting of cellular rubber and foamed thermoplastic elastomer having a Shore hardness between 15 and 45.

18. A seal according to claim 1, wherein said grip rail has a Shore D hardness of between 40 to 80 and is formed from a material selected from the group consisting of polyoxymethylene, polyamide and thermoplastic elastomer.

19. A seal according to claim 18, wherein said first component has a plurality of bores arranged in spaced apart relation, said seal further comprising a plurality of clips positioned between said ribs in spaced relation along and projecting outwardly from said grip rail, said clips each being engageable with one of said bores in said first component.

20. A seal according to claim 18, wherein said base is co-extruded with said sealing profile, said base being formed of a material selected from the group consisting of rubber and a thermoplastic elastomer having a Shore A hardness between 50 and 80 and said sealing profile is formed of a material selected from the group consisting of cellular rubber and a thermoplastic elastomer having a shore hardness between 15 and 45.

21. A seal according to claim 1, wherein said base is co-extruded with said sealing profile, said base being formed of a material selected from the group consisting of rubber and a thermoplastic elastomer having a Shore A hardness between 50 and 80 and said sealing profile is formed of a material selected from the group consisting of cellular rubber and a thermoplastic elastomer having a shore hardness between 15 and 45.

22. A seal according to claim 1, wherein said sealing profile is extruded from a material selected from the group consisting of rubber and a thermoplastic elastomer having a Shore A hardness between 40 and 70.

23. A seal according to claim 1, wherein said sealing profiled is extruded from a material selected from the group consisting of cellular rubber and foamed thermoplastic elastomer having a Shore hardness between 15 and 45.

* * * * *

UNITED STATES PATENT AND TRADEMARK OFFICE
CERTIFICATE OF CORRECTION

PATENT NO. : 6,942,225 B2
DATED : September 13, 2005
INVENTOR(S) : Gentemann et al.

It is certified that error appears in the above-identified patent and that said Letters Patent is hereby corrected as shown below:

Column 1,
Line 18, "dosing" should be -- closing --;
Line 62, "Interval" should be -- interval --;

Column 2,
Line 7, "Is" should be -- is --;
Line 63, "subsequenty" should be -- subsequently --; and Column 3,
Line 9, delete "lo".

Signed and Sealed this

Sixth Day of December, 2005

JON W. DUDAS
*Director of the United States Patent and Trademark Office*